Jan. 8, 1929.  W. O. CASAZZA  1,698,671
AUTOMOBILE SIGNAL
Filed Nov. 22, 1927
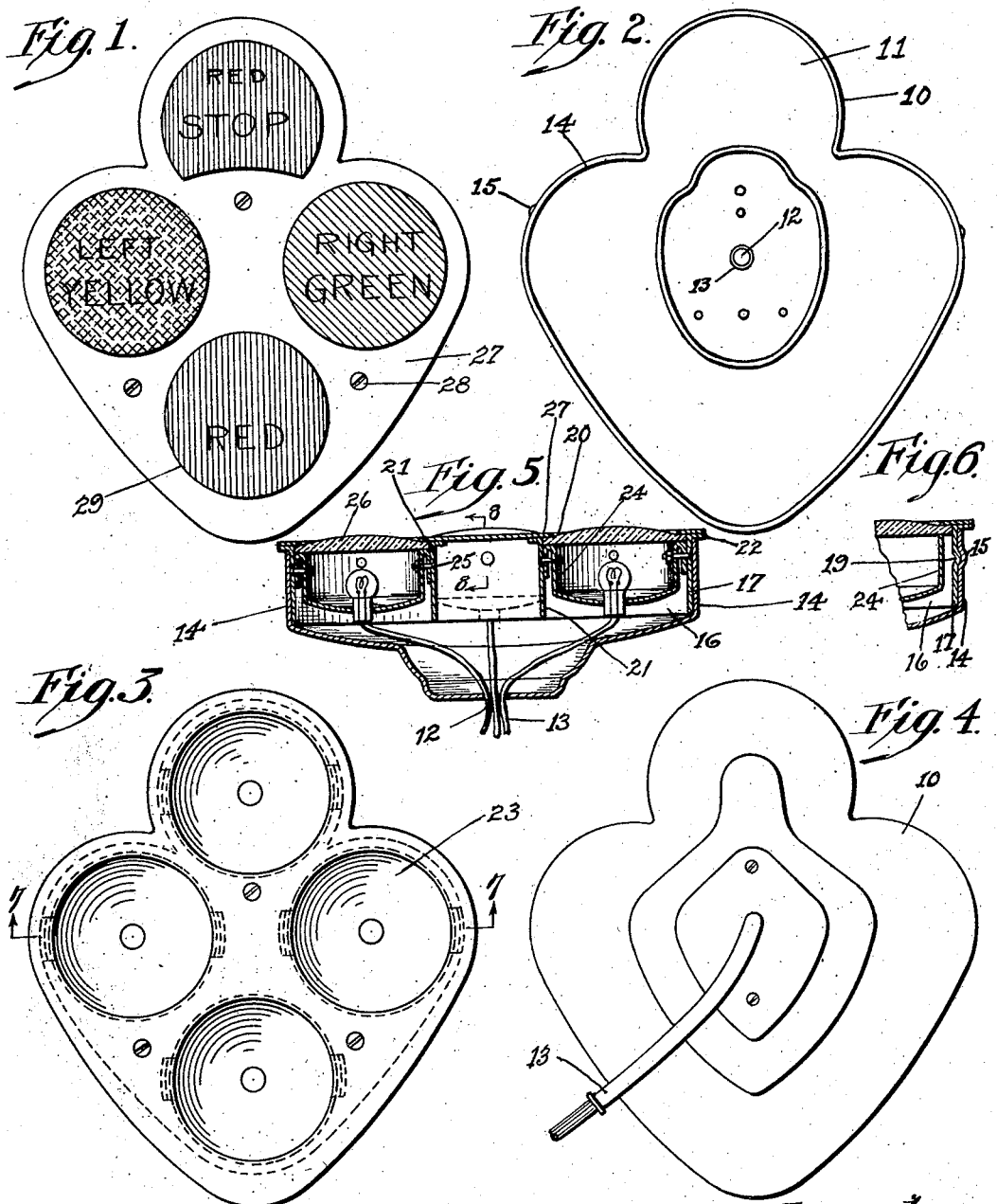
Inventor
William O. Casazza
by Watson E. Coleman
his Attorney Patented Jan. 8, 1929.

1,698,671

UNITED STATES PATENT OFFICE.

WILLIAM OCTILLO CASAZZA, OF VINELAND, NEW JERSEY.

AUTOMOBILE SIGNAL.

Application filed November 22, 1927. Serial No. 235,029.

This invention relates to automobile signals and more particularly to a combined device for signaling the intention of the driver to turn or stop and to provide a tail light signal.

A more specific object of the invention is to improve the structure of such signals so that the device may be readily combined in a signal casing from which any light may be readily removed for replacement.

A further object of the invention is to provide in a device of this character a structure such that it may be very readily assembled and very cheaply produced and which, at the same time, will be durable and efficient in service.

A further object of the invention is to provide a novel and improved means for controlling such signaling mechanism and for indicating to the driver the operation of the signaling mechanism.

These and other objects I attain by the construction shown in the accompanying drawings, wherein for the purpose of illustration is shown a preferred embodiment of my invention and wherein:—

Figure 1 is a front elevation of the complete signal;

Figure 2 is an elevation of the signal casing, the inner casing and reflectors being removed;

Figure 3 is a front elevation of the casing with the lenses and lamps removed;

Figure 4 is a rear elevation of the casing;

Figure 5 is a section on the line 7—7 of Figure 3;

Figure 6 is a fragmentary view of a section on the line 8—8 of Figure 5.

Referring now more particularly to the drawings, the numeral 10 generally designates an outer casing embodying a rear wall 11 having a central opening 12 for the passage of a lead wire conduit 13 and a side wall or rim 14. This side wall or rim has formed in its inner face at spaced intervals dents 15, the purpose of which will presently appear.

The numeral 16 generally designates an inner casing having a peripheral wall 17 conforming to the shaping of the rim 14 of the outer casing and having at spaced intervals humps 19 for engagement in the dents 15 of the outer casing rim. This inner casing wall may be inserted in the outer casing and swung into place, a slight deformation of the rim wall 14 being necessary to the insertion and removal, so that the inner casing will be very firmly held. This inner casing has a front wall with no rear wall and in this front wall are formed openings 20 corresponding in number and arrangement to the number and arrangement of the desired signals. A rearwardly extending rim wall or flange is formed about the edges of each opening, as indicated at 21. The perimeter of the inner casing has an outwardly extending flange 22 which is adapted to seat against the forward edge of the rim 14 of the outer casing and limit movement of the inner casing into the outer casing.

The numeral 23 designates reflectors, each adapted to fit within the flange 21 about an opening 20 and when in applied position, have their outer walls 24 spaced from the flange. The outer wall of each of the reflectors has a portion which is reverted in spaced relation upon the outer wall and from the forward edge thereof. This opening and the wall, together with the flange 21 of the inner casing, are perforated for the passage of securing bolts 25 which are so arranged that the outer or forward edge of the side wall 24 of the reflector is arranged inwardly of the front wall of the inner casing. Since the reverted portions provide for space between the flanges 21 and the side walls 24 of the reflectors, a seat is provided for the outer edges of lenses 26 such as could not be properly provided were the thickness of the metal of the reflectors relied upon alone as a seat. A cover plate 27 is provided, which is adapted to be secured to the outer casing by securing elements 28. This cover plate has openings 29 to register with the reflectors which are of less diameter than the lenses employed, so that they engage against the outer edges of the lenses and hold them in position against the reflectors.

Since the construction hereinbefore set forth is capable of a certain range of change and modification without materially departing from the spirit of the invention, I do not limit myself to such specific structure except as hereinafter claimed.

I claim:

1. In a multiple electrical signal, a casing including a plate having a plurality of openings formed therein and provided about the edges of each opening with an inwardly directed flange, reflectors of less diameter than the internal diameter of the flange disposed within each flange, means securing the reflector in co-axial relation to the flange and with its outer face spaced from the outer face of the plate, lenses fitting within the flanges and abutting the outer faces of the reflectors, and a common securing means for all of said lenses.

2. In a multiple electrical signal, a casing including a plate having a plurality of openings formed therein and provided about the edges of each opening with an inwardly directed flange, reflectors of less diameter than the internal diameter of the flange disposed within each flange, means securing the reflector in co-axial relation to the flange and with its outer face spaced from the outer face of the plate, lenses fitting within the flanges and abutting the outer faces of the reflectors, and a common securing means for all of said lenses comprising a plate abutting the outer face of the first named plate and having openings corresponding in number and arrangement to the openings thereof, said openings being of less diameter than the openings of the first named plate whereby the edges thereof abut said lenses to maintain them in position within the flanges.

In testimony whereof I hereunto affix my signature.

WILLIAM OCTILLO CASAZZA.